(12) United States Patent
Ekici et al.

(10) Patent No.: US 12,450,905 B2
(45) Date of Patent: Oct. 21, 2025

(54) SYSTEM AND METHOD FOR ANALYZING PERIODIC TASK

(71) Applicant: Khenda, Inc., Lewes, DE (US)

(72) Inventors: Cagkan Ekici, Istanbul (TR); Yusuf Akgul, Kocaeli (TR); Ozan Kerem Devamli, Istanbul (TR)

(73) Assignee: Khenda, Inc.

( * ) Notice: Subject to any disclaimer, the term of this patent is extended or adjusted under 35 U.S.C. 154(b) by 477 days.

(21) Appl. No.: 17/956,910

(22) Filed: Sep. 30, 2022

(65) Prior Publication Data

US 2024/0112466 A1  Apr. 4, 2024

(51) Int. Cl.
*G06V 20/40* (2022.01)
*G06V 10/82* (2022.01)

(52) U.S. Cl.
CPC .............. *G06V 20/44* (2022.01); *G06V 10/82* (2022.01); *G06V 20/46* (2022.01)

(58) Field of Classification Search
CPC ......... G06V 20/44; G06V 20/46; G06V 10/82
USPC ....................................................... 382/103
See application file for complete search history.

(56) References Cited

U.S. PATENT DOCUMENTS

| 11,017,690 | B1 | 5/2021 | Zia et al. | |
| 11,157,845 | B2 | 10/2021 | Zavesky et al. | |
| 2022/0114495 | A1* | 4/2022 | Nurvitadhi | ............ G06F 9/5044 |
| 2022/0207454 | A1* | 6/2022 | Carey | ..................... G06Q 10/00 |
| 2024/0005263 | A1* | 1/2024 | Choi | ...................... G06V 20/36 |

* cited by examiner

*Primary Examiner* — Michael R Neff
(74) *Attorney, Agent, or Firm* — Bayramoglu Law Offices LLC

(57) ABSTRACT

A periodic task analysis system which analyzes a task conducted by an actor periodically includes a data collecting subsystem including at least one of an imaging device configured to image a state where a plurality of fundamental work operations is performed periodically, and at least one sensing means collecting data from the state; a data receiving subsystem operatively coupled to the data collecting subsystem, where the data receiving subsystem is configured to receive at least one of a video file recorded by the imaging device and a sensor data recorded by the sensing means; a task learning subsystem operatively coupled to the data receiving subsystem, where the task learning subsystem is configured to identify one or more sub-tasks from at least one of the recorded video file and the recorded sensor data; and a task analyzing subsystem. A method for analyzing a periodic task is also provided.

9 Claims, 2 Drawing Sheets

SYSTEM AND METHOD FOR ANALYZING PERIODIC TASK

TECHNICAL FIELD

The present invention relates to a periodic task analysis system which analyzes a task conducted periodically by an actor.

BACKGROUND

In a state where a plurality of fundamental work operations is performed periodically, it is necessary to optimize a work procedure. Monitoring the state is used for determining that the work operations are performed correctly or not. Besides, monitoring the state is used for determining the related sub-task which is being performed by the actor in real time. However, the systems and/or the methods in the state of the art do not determine completion percentage of the periodic task. Determining the progression rate or completion percentage of the periodic task continuously is needed for analyzing the periodic task efficiently.

A prior art publication in the technical field of the present invention may be referred to as U.S. Pat. No. 11,017,690 (B1) which discloses a system for building computational models of a goal-driven task from demonstration is disclosed.

Another prior art publication in the technical field of the present invention may be referred to as U.S. Pat. No. 11,157,845 (B2) which discloses devices, computer-readable media, and methods for detecting a deviation from a workflow associated with a physical item.

SUMMARY

An object of the present invention is in particular to provide a monitoring and controlling system for a production workplace and a method for monitoring compliance with the defined sequence of work steps in production, through which the error rate in the production process can be significantly minimized.

The present invention proposes a periodic task analysis system which analyzes a task conducted by an actor periodically including a data collecting subsystem including at least one of an imaging device configured to image a state where a plurality of fundamental work operations are performed periodically, and at least one sensing means collecting data from the state; a data receiving subsystem operatively coupled to the data collecting subsystem, wherein the data receiving subsystem is configured to receive at least one of a video file recorded by the imaging device and a sensor data recorded by the sensing means; a task learning subsystem operatively coupled to the data receiving subsystem, wherein the task learning subsystem is configured to identify one or more sub-tasks from at least one of the recorded video file and the recorded sensor data, wherein the sub-tasks follow each other periodically in a loop; a task analyzing subsystem operatively coupled to the data collecting subsystem and the task learning subsystem, wherein the task analyzing subsystem is configured to receive a predetermined number of data list which is at least one of a predetermined number of frames of a live video streaming obtained by the imaging device and a predetermined number of sensor data of live streaming sensor data obtained by the sensing means in order to evaluate real time operations, and is configured to generate a progress position which indicates related sub-task which is being performed by the actor in real time, wherein the progress position indicates also completion percentage of related sub-task based on the data list. As used herein, the term 'actor' is defined as a human performing a periodic task as represented in the recorded video file or the live streaming video. The imaging device may be a CCTV camera or depth camera. Sensing means may be an optical sensor, infrared sensor, time of flight sensor, radar sensor, sonar sensor or any other sensor types. The sub-tasks follow each other periodically. In other words, after the last sub-task of the periodic task is performed, first sub-task of the periodic task is performed. The periodic task may be a manufacturing task in a production line. The sub-tasks may be a manufacturing state. Therefore, monitoring and evaluating the periodic task simultaneously and continuously are provided. The remote monitoring solution provided by the present disclosed system not only improves in easy workforce management across the organizations but also saves human effort and time by reducing physical monitoring process.

In another embodiment of the present invention, the task learning subsystem includes an input unit configured to enable an instructor to determine the labeled data corresponding to at least one of the related frames of the recorded video file and related sensor data of recorded sensor data. The input unit includes a user interface which enables the user to put the labeled data into the task learning subsystem. Therefore, the labeled data consisting of plurality of labeled data is obtained manually.

In a possible embodiment, the task learning subsystem and task analyzing subsystem include a convolutional neural network (CNN) and a transformer coupled to the CNN.

In another embodiment of the present invention, the task analyzing subsystem is configured to provide a guidance feedback data in real-time to the one or more actors using one or more types of alerts. In a particular embodiment, the one or more type of the alerts may include at least one of a visual alert, a haptic alert, an audio alert or a combination thereof. Therefore, the actor is guided and thus error rate in the production process is decreased.

The present invention proposes a method for analyzing a task conducted by an actor periodically including the steps of imaging a state where a plurality of fundamental work operations is performed periodically by an imaging device or collecting data from the state by at least one sensing means, by a data collecting subsystem; receiving a video file recorded by the imaging device or a sensor data recorded by the sensing means, by a data receiving subsystem; identifying one or more sub-tasks from the recorded video file or the recorded sensor data by a task learning subsystem, wherein the sub-tasks follow each other periodically in a loop; generating a labeled data by using at least one of the frames of the recorded video file and the recorded sensor data, by the task learning subsystem; receiving predetermined a number of data set which is predetermined number of frames of a live video streaming obtained by the imaging device or predetermined a number of sensor data of live streaming sensor data obtained by the sensing means in order to evaluate real time operations, by a task analyzing subsystem, generating a progress position which indicates related sub-task which is being performed by the actor in real time, wherein the progress position indicates also completion percentage of related sub-task based on the data set, by the task analyzing subsystem.

BRIEF DESCRIPTION OF THE DRAWINGS

The accompanying drawings are given solely for the purpose of exemplifying the present invention whose advantages over prior art were outlined above and will be explained in detail hereinafter.

DETAILED DESCRIPTION OF THE EMBODIMENTS

Figure 1:
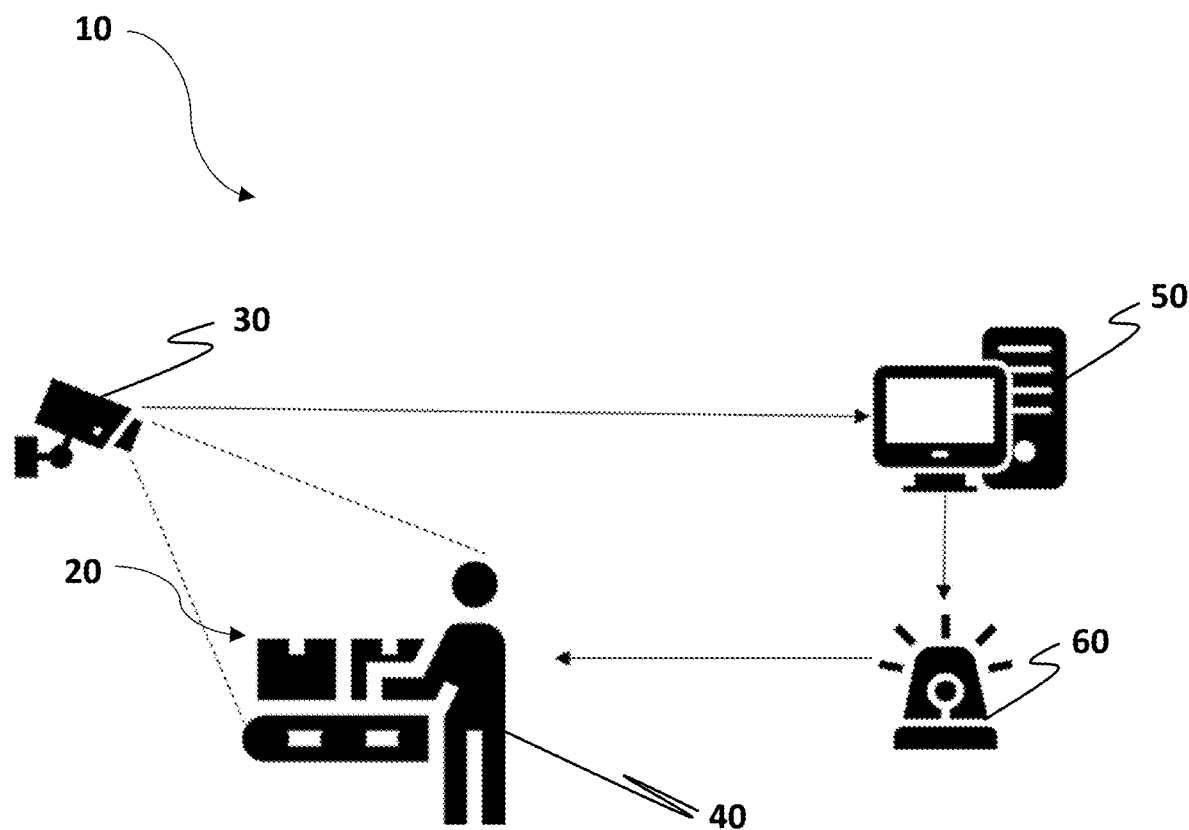
FIG. 1 is a schematic view of a periodic task analysis system

The present invention proposes a periodic task analysis system 10 which analyzes a task conducted by an actor 40 periodically including a data collecting subsystem including at least one of an imaging device 30 configured to image a state 20 where a plurality of fundamental work operations is performed periodically, and at least one sensing means collecting data from the state 20; a data receiving subsystem operatively coupled to the data collection subsystem, wherein the data receiving subsystem is configured to receive at least one of a video file recorded by the imaging device 30 and a sensor data recorded by the sensing means, wherein the task learning subsystem is configured to generate a labeled data by using at least one of the frames of the recorded video file and the recorded sensor data; a task learning subsystem operatively coupled to the data receiving subsystem, wherein the task learning subsystem is configured to identify one or more sub-tasks from at least one of the recorded video file and the recorded sensor data, wherein the sub-tasks follow each other periodically in a loop. The data receiving subsystem includes a database. The recorded video file and/or the sensor data obtained by the sensing means is stored in the database. The task learning subsystem is coupled to the data receiving subsystem. The task learning subsystem divides the one task into the sub-tasks by identifying the sub-tasks from the recorded video file and/or the recorded sensor data. The task learning subsystem labels a frame of the recorded video file as a starting point of a sub-task. The task learning subsystem is configured to generate a labeled data by using at least one of frames of the recorded video file and the recorded sensor data.

In the preferred embodiment of the present invention, the task learning subsystem evaluates a predetermined number of frames obtained from the recorded video file and generates a labeled data which identifies the sub-task performed in the predetermined number of frames and which identifies the completion percentage of the related sub-task. The task learning subsystem includes a deep learning model. Labeled data is generated by using a training data such as a number of frames of the recorded video file or a number of sensor data of the recorded sensor data. The training data is evaluated by the deep learning model. The deep learning model generates an output and the labeled data is generated based on the output of the deep learning model. The labeled data indicates the related sub-task which is performed by the actor 40 in the related frames of the recorded video file. Labeled data also indicates completion percentage of the related sub-task. The task learning subsystem generates plurality of labeled data by evaluating plurality of different group of the frames of the recorded video file. Each of the labeled data corresponds to each of the groups of the frames of the recorded video file. Each of the labeled data identifies the sub-task performed in the related group of the frames and identifies the completion percentage of the related sub-task. For instance, a task is recorded by the imaging device 30 and the recorded video file has 100 frames. The task learning subsystem evaluates the frames numbered 1 to 10 and generates a first labeled data related to the frames numbered between 1 to 10. Then, the task learning subsystem evaluates the frames numbered 2 to 11; and generates a second labeled data related the frames numbered 2 to 11. Then, the task learning subsystem evaluates the frames numbered 3 to 12; and generates a third labeled data related the frames numbered 3 to 12. The task learning subsystem evaluates the plurality of different group of the frames such that all of the frames are evaluated. Each different group of the frames of the recorded video file is named as training data. Whole recorded video file may also be another training data. Plurality of the labeled data are generated by the task learning subsystem. These labeled data are stored in the database of the data receiving subsystem. In another embodiment of the present invention, plurality of training data is selected arbitrary such that one of the training data is composed of frames numbered 77 to 86, and the next training data is composed of frames numbered 33 to 42, and the next training data is composed of frames 55 to 64. In this case, task learning subsystem generates plurality of labeled data in a more accurate way, wherein each of labeled data is generated based on the corresponding training data.

Figure 2:
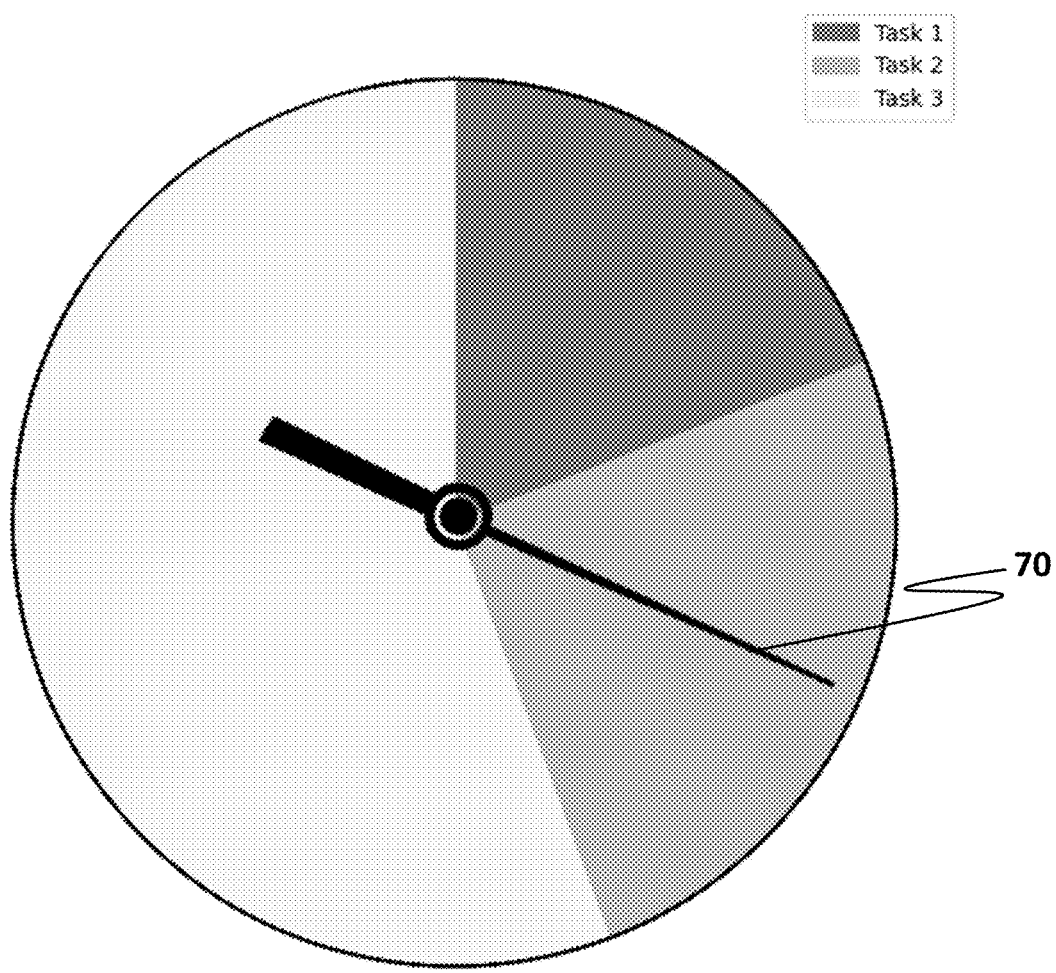
FIG. 2 is a schematic view of an example of a progress position

The periodic task analysis system includes also a task analyzing subsystem 50. The task analyzing subsystem 50 is operatively coupled to the data collecting subsystem and the task learning subsystem, wherein the task analyzing subsystem 50 is configured to receive a predetermined number of data list which is at least one of a predetermined number of frames of a live video streaming obtained by the imaging device 30 and a predetermined number of sensor data of live streaming sensor data obtained by the sensing means in order to evaluate real time operations, and is configured to generate a progress position 70 which indicates related sub-task which is being performed by the actor 40 in real time, wherein the progress position 70 indicates also completion percentage of related sub-task based on the data list and the labeled data. The task analyzing subsystem 50 analyzes the real time operations performed at the state 20. The task analyzing subsystem 50 receives a predetermined number of data list. Data list includes at least one frame of a live video streaming, preferably plurality of frame, and/or at least one live streaming sensor data obtained by the sensing means. The task analyzing subsystem 50 generates the progress position 70 by using the labeled data and the data list. The progress position 70 indicates related sub-task which is being performed by the actor 40 in real time. As can be seen in FIG. 2, the progress position 70 also indicates completion percentage of related sub-task. Referring to FIG. 2, when a periodic task is illustrated as a circle, a sub-task is placed on the circle so as to be between two angles generated from labeled data. In FIG. 2, Task 1, Task 2 and Task 3 are illustrated with different colors. Each of Task 1, Task 2 and Task 3 is a sub-task of a periodic task. The task analyzing subsystem 50 generates a progress position 70 illustrated as a dial needle on the circle. Thus, completion percentage of the related sub-task and the periodic task is determined by the task analyzing subsystem 50. The progress position 70 is generated as a regression output. Therefore, the periodic task is monitored continuously.

The task analyzing subsystem 50 uses the deep learning model. The frames of the live streaming video are evaluated by the deep learning model. The deep learning model generates an output. The progress position 70 is generated based on the output of the deep learning model. The progress position 70 is generated corresponding to the frames of the live streaming video, wherein the frames of the live streaming video are given as an input to the deep learning model of the task analyzing subsystem 50.

In another embodiment of the present invention, the task learning subsystem updates the deep learning model by comparing the progress position 70 and the labeled data, after the progress position 70 is generated.

In another embodiment of the present invention, the task learning subsystem includes an input unit configured to enable an instructor to determine the labeled data corresponding to at least one of the related frames of the recorded video file and related sensor data of recorded sensor data. Instructor determines the labeled data which corresponds to the related frames of the recorded video file. Instructor may determine the labeled data which corresponds to the related sensor data of recorded sensor data. Instructor may also determine the labeled data which corresponds to the related frames of the recorded video file and related sensor data of recorded sensor data. Therefore, labeled data are generated manually.

In another embodiment of the present invention, the task learning subsystem includes a convolutional neural network (CNN) and a transformer coupled to the CNN. In other words, the task learning subsystem includes a deep learning model including a convolutional neural network (CNN) and a transformer coupled to the CNN. The labeled data is generated by using the CNN and the transformer. Each of the frames of recorded vide file is evaluated by the CNN in order to generate an embedding vector for each of the frames. A predetermined number of embedding vectors are evaluated by the transformer. In an embodiment of the present invention, 7 frames of the recorded video files are given as an input to the CNN, wherein the frames have a size of 224×224×3. In this embodiment, output of the CNN is embedding vector having a dimension of 7×4096. This embedding vector is given as an input to the transformer. The transformer generates another embedding vector as an output, which is used for generating the labeled data. Since plurality of frames which are serial, is evaluated by using the transformer, time data is evaluated and deducted. Therefore, noise effect is decreased during evaluation of the training data, when the training data has noise. Besides, region of interest in the frames of the recorded video file may be determined by using the transformer.

In another embodiment of the present invention, the task analyzing subsystem 50 includes a convolutional neural network (CNN) and a transformer coupled to the CNN. In other words, the task analyzing subsystem 50 includes deep learning model including includes a convolutional neural network (CNN) and a transformer coupled to the CNN. Each of the frames of live streaming video is evaluated by the CNN in order to generate an embedding vector for each of the frames. A predetermined number of embedding vectors are evaluated by the transformer. The transformer generates another embedding vector which is used for generating the progress position 70 corresponding to the predetermined number of embedding vectors, by the task analyzing subsystem 50. Region of interest in the frames of the live streaming video may be determined by using the transformer.

In another embodiment of the present invention, the task analyzing subsystem 50 is configured to provide a guidance feedback data 60 in real-time to the one or more actors 40 using one or more types of alerts. In one embodiment, the guidance feedback data 60 may include a positive feedback to proceed with a subsequent process within the periodic task when the sub-tasks are performed correctly. Therefore, motivation of the actor 40 is improved. In another embodiment, the guidance feedback data 60 may include a guidance for fixing one or more mistakes committed by the one or more actors 40 in performing the periodic task. Therefore, the error rate in the production line is decreased.

In another embodiment of the present invention, the task analyzing subsystem 50 is configured to provide an alert to the actor 40 when the task analyzing subsystem 50 determines that the sub-tasks are performed in incorrect sequence. Therefore, the actor 40 is warned by the task analyzing subsystem 50 early enough. Thus, efficiency of manufacturing is enhanced.

The present invention proposes a method for analyzing a task conducted by an actor 40 periodically. First step of the method is imaging a state 20 where a plurality of fundamental work operations is performed periodically by an imaging device 30 or collecting data from the state 20 by at least one sensing means, by a data collecting subsystem. In one embodiment, receiving the recorded video file or the recorded sensor data representative of the expert demonstration task may include receiving the recorded video file or the recorded sensor data recorded by an image capturing device or an optical sensor respectively. In another embodiment, receiving the recorded video file or the recorded sensor representative of the expert demonstration task may include the recorded video file or the recorded sensor data representative of the demonstration of the task including, but not limited to, performing a lumbar puncture on a medical simulator, assembling a car door in an automobile manufacturing unit, assembling a printed circuit board (PCB) in a manufacturing industry and the like. Collected data is received, by a data collecting subsystem. The data collecting subsystem includes a database, wherein the collected data is stored in the database. Collected data is at least one of recorded video file or recorded sensor data. Third step of the method is identifying one or more sub-tasks from the recorded video file or the recorded sensor data by a task learning subsystem, wherein the sub-tasks follow each other periodically in a loop. After the learning section is completed, the method is used in real time operations for analyzing the task. The method includes further step of receiving predetermined a number of data set which is predetermined number of frames of a live video streaming obtained by the imaging device 30 or predetermined a number of sensor data of live streaming sensor data obtained by the sensing means in order to evaluate real time operations, by a task analyzing subsystem 50; generating a progress position 70 which indicates related sub-task which is being performed by the actor 40 in real time, wherein the progress position 70 indicates also completion percentage of related sub-task based on the data set, by the task analyzing subsystem 50. Thus, monitoring and evaluating the periodic task continuously is realized.

The method including further the step of providing a guidance feedback data 60 in real-time to the one or more actors 40 using one or more types of alerts, by a task analyzing subsystem 50. The guidance feedback data 60 is stored in the database. Therefore, performance of the actor 40 may be evaluated by using the guidance feedback data 60.

The method including further the step of enabling an instructor to determine the labeled data, by using an input unit of a task learning subsystem. Input unit includes a display which enables an instructor to put data into the task learning subsystem.

While specific language has been used to describe the disclosure, any limitations arising on account of the same are not intended. As would be apparent to a person skilled in the art, various working modifications may be made to the method in order to implement the inventive concept as taught herein.

REFERENCE LIST

10. A periodic task analysis system
20. State
30. Imaging device
40. Actor
50. Task analyzing subsystem
60. Guidance feedback data
70. Progress position

What is claimed is:

1. A periodic task analysis system, wherein the periodic task analysis system analyzes a task conducted periodically by an actor, comprising:
   a data collecting subsystem, wherein the data collecting subsystem comprises at least one of an imaging device configured to image a state where a plurality of fundamental work operations are performed periodically, and at least one sensing means, wherein the at least one sensing means collects data from the state;
   a data receiving subsystem, wherein the data receiving subsystem is operatively coupled to the data collecting subsystem, and the data receiving subsystem is configured to receive at least one of a video file and sensor data, wherein the video file is recorded by the imaging device, and the sensor data is recorded by the at least one sensing means;
   a task learning subsystem, wherein the task learning subsystem is operatively coupled to the data receiving subsystem, and the task learning subsystem is configured to identify at least one sub-task from the at least one of the video file and the sensor data, wherein the at least one sub- task follows each other periodically in a loop; wherein the task learning subsystem is configured to generate labeled data by using at least one of frames of the video file and the sensor data, wherein the labeled data indicates a completion percentage of a related sub-task,
   a task analyzing subsystem, wherein the task analyzing subsystem is operatively coupled to the data collecting subsystem and the task learning subsystem, and the task analyzing subsystem is configured to
   receive a predetermined number of data list, wherein the predetermined number of data list is at least one of a predetermined number of frames of a live video streaming obtained by the imaging device and a predetermined number of sensor data of live streaming sensor data obtained by the at least one sensing means, to evaluate real time operations,
   and the task analyzing subsystem is configured to generate a progress position, wherein the progress position indicates the related sub-task, wherein the progress position is generated as a regression output and the related sub-task is being performed by the actor in real time, and wherein the progress position indicates, during performance of the related sub-task, further the completion percentage of the related sub-task based on a continuous evaluation of the predetermined number of data list and the labeled data.

2. The periodic task analysis system according to claim 1, wherein the task learning subsystem comprises an input unit, wherein the input unit is configured to enable an instructor to determine the labeled data, wherein the labeled data corresponds to at least one of the related frames of the video file and related sensor data of the sensor data.

3. The periodic task analysis system according to claim 1, wherein the task learning subsystem comprises a convolutional neural network (CNN) and a transformer, wherein the transformer is coupled to the CNN.

4. The periodic task analysis system according to claim 1, wherein the task analyzing subsystem comprises a convolutional neural network (CNN) and a transformer, wherein the transformer is coupled to the CNN.

5. The periodic task analysis system according to claim 1, wherein the task analyzing subsystem is configured to provide guidance feedback data in real-time to at least one actor by using at least one type of alerts.

6. The periodic task analysis system according to claim 5, wherein the task analyzing subsystem is configured to provide an alert to the actor when the task analyzing subsystem determines that the at least one sub-task is performed in an incorrect sequence.

7. A method for analyzing a task conducted by an actor periodically comprising the steps of:
   imaging a state where a plurality of fundamental work operations are performed periodically by an imaging device or collecting data from the state by at least one sensing means, by a data collecting subsystem;
   receiving a video file or sensor data, wherein the video file is recorded by the imaging device, and the sensor data is recorded by the at least one sensing means, by a data receiving subsystem;
   identifying at least one sub-task from the video file or the sensor data by a task learning subsystem, wherein the at least one sub-task follows each other periodically in a loop;
   generating labeled data by using at least one of frames of the video file or the sensor data, by the task learning subsystem, wherein the labeled data indicates a completion percentage of a related sub-task;
   receiving a predetermined number of data set, wherein the predetermined number of data set is a predetermined number of frames of a live video streaming obtained by the imaging device or a predetermined number of sensor data of live streaming sensor data obtained by the at least one sensing means, to evaluate real time operations, by a task analyzing subsystem,
   generating a progress position, wherein the progress position indicates the related sub-task, wherein the progress position is generated as a regression output and the related sub-task is being performed by the actor in real time, and wherein the progress position indicates, during performance of the related sub-task, further the completion percentage of the related sub-task based on a continuous evaluation of the predetermined number of data set and the labeled data, by the task analyzing subsystem.

8. The method according to claim 7, comprising further the step of:
   providing guidance feedback data in real-time to at least one actor by using at least one type of alerts, by the task analyzing subsystem.

9. The method according to claim 7, comprising further the step of:
   enabling an instructor to determine the labeled data by using an input unit of the task learning subsystem.

* * * * *